Feb. 15, 1955   T. DIETRICH   2,701,914
TOOL HOLDER, CHIEFLY FOR DENTISTS' TOOLS
Filed Sept. 16, 1952
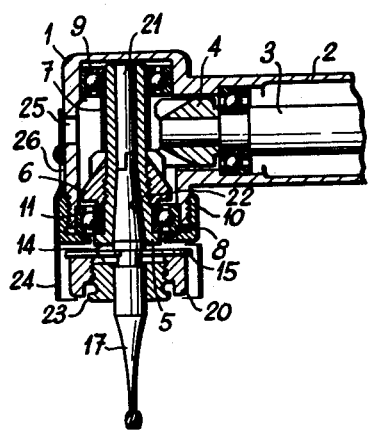
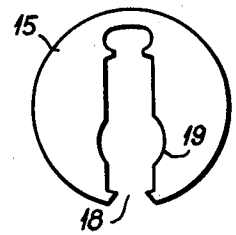
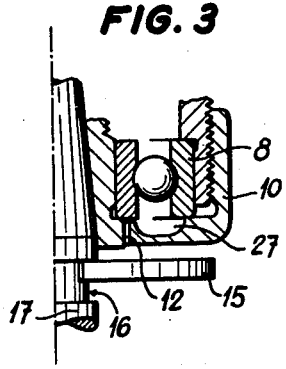
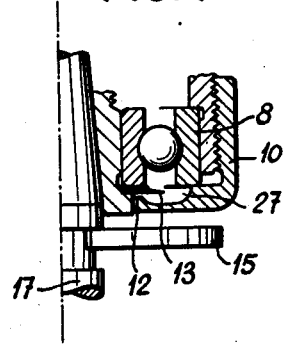
Inventor
Theodor Dietrich
By Robert E. Burns
Attorney

United States Patent Office 2,701,914
Patented Feb. 15, 1955

2,701,914

TOOL HOLDER, CHIEFLY FOR DENTISTS' TOOLS

Theodor Dietrich, Geneva, Switzerland, assignor to Sodeco, Societe des Compteurs de Geneve, Geneva, Switzerland, a Swiss firm Application September 16, 1952, Serial No. 309,876

Claims priority, application Switzerland November 9, 1951

11 Claims. (Cl. 32—27)

The present invention has for its object a tool holder, chiefly for dentists' tools, said tool holder including a chuck made of a single part, provided with a removable safety washer preventing any undesired dropping of the tool, said chuck being associated with a clamping nut also secured against dropping out.

Tool holders provided with chucks made of a single part and with a removable safety washer are already known, but they are, however, associated with a securing nut that is not protected against fortuitous dropping out. Furthermore, chucks of a similar type have been executed hitherto in two parts in order to reliably hold the securing nut and to prevent its dropping out.

My invention is novel inasmuch as it provides a chuck made of a single part and including a flange preventing the dropping out of the securing nut. Furthermore, an opening in the shape of a keyhole is formed in the removable safety washer in a manner such that the breadth of said opening is somewhat smaller at the edge of the washer than the breadth of the web provided in the chuck for engagement by the washer, this arrangement preventing any dropping out of the safety washer.

I have illustrated in accompany drawings a preferred embodiment of my invention. In said drawings:

Fig. 1 illustrates cross-sectionally the tool holder in its operative tool-carrying position;

Fig. 2 is a view from above of the safety washer;

Fig. 3 is a cross-section through the outer bearing system, in a first modification;

Fig. 4 is a cross-section of said outerbearing system in a further modification.

The tool holder illustrated includes a casing 1 formed in the usual manner by a member bent at right angles and provided with a tubular extension 2 the end of which is torn off in the drawing, said extension carrying the driving spindle 3. Said driving spindle carries in the vicinity of the casing a bevel gear 4 meshing with a bevel gear 6 rigid with the chuck 5. In the embodiment illustrated, the bevel wheel 6 is screwed over said chuck 5. The bevel wheel 6 is generally made of hardened steel and forms a small piece that it is not easy to press or to upset over a cooperating part. Furthermore, the welding of such a piece is objectionable inasmuch as it is necessary to remove subsequently the excess of welding material from the gear teeth. The threaded connection shown in the example illustrated is held against unscrewing by the fact that one terminal wall of the bevel gear 6 presses against the inner race of the roller bearing 8 while a safety ring or sleeve 7 that is upset or welded over the chuck, is pressed against the other or rear terminal surface of the bevel gear.

The chuck is carried by two roller bearings 8 and 9 which have their axis in register with the axis of the chuck and are urged with a tight fit over the latter, the outer races of said bearings being slightly slidable in the corresponding seats formed in the casing 1. The outer bearing 8 plays the part of a carrying and guiding bearing while the inner bearing 9 acts only as a guiding bearing. A flanged nut 10 presses the outer race of the roller bearing 8 against the shoulder 11 defining the outer seat formed for said bearing inside the casing 1. The chuck assumes thus a position that is defined in an unequivocal manner with a clearance corresponding solely to that provided by the roller bearing 8, and this has an extremely favorable action on the reliability of the guiding of the tool.

The bore in the flanged nut 10 forms, with the adjacent cylindrical periphery of the chuck, a narrow slot 12 acting as a baffle that prevents any entrance of dust. As shown in Fig. 3, it is possible to provide, through a milling or slight boring of the surface of the flange of the flanged nut, a dished section 27 that may serve as an oil collector. Similarly, an annular oil scraper 13, illustrated in Fig. 4, may serve for the removal of the oil flowing downwardly towards the slot 12 during operation and for the deflection of same into the dished section 27.

Two diametrical cuts 14 define inside the chuck a web the width of which is approximately equal to that of a restricted cross-section 16 formed in the tool, constituted by way of example by a dentist's drill or milling cutter. Over said web formed in the chuck is fitted a safety washer 15 illustrated in plan view in Fig. 2, the opening in said washer at 18 being slightly urged open for this fitting over the web and being allowed to resume its normal breadth after the washer has been actually fitted over the web of the chuck. If the washer is made of elastic material, the opening 18 closes automatically to resume its original breadth, which prevents any undesired subsequent dropping out of the washer. The opening in the washer is partly formed by an eccentric round cut 19 the size of which is equal to that of the cross-section of the tool. When the safety washer is shifted in a manner such that the center of the cut 19 therein registers with the axis of the chuck, it is thus possible to introduce the tool into the chuck. If the safety washer is shifted into a position for which it is concentric with the tool and chuck, the restricted shouldered cross-section 16 in the tool is partly engaged by the rectangular section of the opening in the washer, whereby the tool is held reliably against dropping out. A screwing down of the milled securing nut 20 holds the safety washer in position and causes the tool engaged by the driving spindle 21 fitted inside the cylindrical bore of the chuck to be held fast inside the conical opening 22 of the chuck.

The mounting of the tool holder is obtained by first screwing the screwing nut 20 over the chuck. This being done, the flanged nut 10 is engaged over the chuck, the roller bearing 8 is fitted in the desired position over said chuck and the toothed bevel wheel 6 is screwed over the latter, after which the ring or sleeve 7 is fitted and welded and the second roller bearing 9 is fitted with a force fit and the arrangement thus formed by the chuck and the parts mounted thereon, is introduced inside the casing 1 and the flanged nut 10 is screwed over the casing to secure the said arrangement in position. As the front end of the chuck is provided with a flange 23, which is larger than the bore in the securing nut 20, the latter can never drop out and be lost.

A sliding sheath 24 serves as a protection against undesired or fortuitous contact with the tool; said sheath may be urged back over the securing nut when it is desired to change the tool.

The lubrication of the roller bearings and of the gears in the assembled tool holder may be provided by means of a lubricating aperture 25 formed in the casing wall. To prevent the entrance of any dust inside the chamber formed by the casing round the chuck, a sliding cap 24 covers said lubricating opening 25 during operation while a suitable opening 26 in said cap may register with the lubricating opening as soon as the cap 24 has been shifted rearwardly.

What I claim is:

1. In a tool holder, chiefly for holding a dentist's shouldered, rotatable tool having a tapered shank and a working head, the combination of an elongated chuck made in one piece having a rear end remote from said tool head and a fore end nearer to said tool head, said chuck being provided with an axial bore including a frusto-conical portion adapted to hold said tapered tool shank, said chuck comprising, from its rear end to its fore end, a portion having a smooth outer surface, an externally threaded portion and a peripheral outer flange, said chuck further being provided, between said smooth portion and said threaded portion, with a transverse cut extending inwardly into its axial bore and leaving a web connecting said threaded portion with said smooth portion, a securing nut engaging the threaded portion of the chuck, an apertured safety washer provided with a shaped opening extending to the periphery of the washer and adapted to be fitted slidingly over the web in the chuck and to resiliently engage, when in its operative position, the shoulder on a tool inside the chuck and to prevent thereby the dropping out of the tool, said securing nut being adapted, when screwed in, to press said washer against said shoulder in order to firmly secure said tapered tool shank into said frusto-conical portion of said bore in the chuck, a casing enclosing the chuck and provided with an opening for the fore end of the chuck and with two inner annular seats coaxial with the said opening, an anti-friction bearing fitted in each of said seats and rotatably supporting respectively the rear end of the chuck and a portion thereof lying between the web and said smooth portion.

2. In a tool holder, chiefly for holding a dentist's shouldered, rotatable tool having a tapered shank and a working head, the combination of an elongated chuck made in one piece having a rear end remote from said tool head and a fore end nearer to said tool head, said chuck being provided with an axial bore including a frusto-conical portion adapted to hold said tapered tool shank, said chuck comprising, from its rear end to its fore end, a portion having a smooth outer surface, an externally threaded portion and a peripheral outer flange, said chuck further being provided, between said smooth portion and said threaded portion, with a transverse cut extending inwardly into its axial bore and leaving a web connecting said threaded portion with said smooth portion, a securing nut engaging the threaded portion of the chuck, an apertured safety washer provided with a shaped opening extending to the periphery of the washer and adapted to be fitted slidingly over the web in the chuck and to resiliently engage, when in its operative position, the shoulder on a tool inside the chuck and to prevent thereby the dropping out of the tool, said securing nut being adapted, when screwed in, to press said washer against said shoulder in order to firmly secure said tapered tool shank into said frusto-conical portion of said bore in the chuck, a casing enclosing the chuck and provided with an opening for the fore end of the chuck and with two inner annular seats coaxial with the said opening, an anti-friction bearing fitted in each of said seats and rotatably supporting respectively the rear end of the chuck and a portion thereof lying between the web and said smooth portion, a portion of said casing surrounding said opening being threaded, a nut screwed on said threaded portion of the casing and having an inwardly extending flange engaging the forward bearing to position said bearing and thereby position said chuck in said casing.

3. A tool holder according to claim 2, in which said flanged nut defines between the inner periphery of its flange and the outer periphery of said chuck a dust-proof baffle.

4. A tool holder according to claim 3, in which the surface of the flange of said flanged nut facing the inside of the casing is provided with an annular lubricant-collecting recess.

5. A tool holder according to claim 4, in which an annular lubricant deflector is fixed to the outer periphery of the chuck just in front of the forward one of said bearings and projects outwardly to deflect lubricant into said lubricant-collecting recess.

6. In a tool holder, chiefly for holding a dentist's shouldered, rotatable tool having a tapered shank and a working head, the combination of an elongated chuck made in one piece having a rear end remote from said tool head and a fore end nearer to said tool head, said chuck being provided with an axial bore including a frusto-conical portion adapted to hold said tapered tool shank, said chuck comprising, from its rear end to its fore end, a portion having a smooth outer surface, an externally threaded portion and a peripheral outer flange, said chuck further being provided, between said smooth portion and said threaded portion, with a transverse cut extending inwardly into its axial bore and leaving a web connecting said threaded portion with said smooth portion, a securing nut engaging the threaded portion of the chuck, an apertured safety washer provided with a shaped opening extending to the periphery of the washer and adapted to be fitted slidingly over the web in the chuck and to resiliently engage, when in its operative position, the shoulder on a tool inside the chuck and to prevent thereby the dropping out of the tool, said securing nut being adapted, when screwed in, to press said washer against said shoulder in order to firmly secure said tapered tool shank into said frusto-conical portion of said bore in the chuck, a casing enclosing the chuck and provided with an opening for the fore end of the chuck and with two inner annular seats coaxial with the said opening, an anti-friction bearing fitted in each of said seats and rotatably supporting respectively the rear end of the chuck and a portion thereof lying between the web and said smooth portion, a portion of said casing surrounding said opening being threaded, a nut threadedly engaging said threaded portion of the casing and having an inwardly extending flange engaging the forward bearing to position said bearing and thereby position said chuck in said casing, a sleeve surrounding and fixed to said chuck and extending forwardly from the rearward one of said bearings, a driving gear threadedly engaging said chuck and held fast between the forward end of said sleeve and the forward one of said bearings.

7. A tool holder according to claim 6, in which said sleeve is welded to said chuck.

8. A tool holder according to claim 6, in which said sleeve is shrunk onto said chuck.

9. In a tool holder, chiefly for holding a dentist's shouldered, rotatable tool having a tapered shank and a working head, the combination of an elongated chuck made in one piece having a rear end remote from said tool head and a fore end nearer to said tool head, said chuck being provided with an axial bore including a frusto-conical portion adapted to hold said tapered tool shank, said chuck comprising, from its rear end to its fore end, a portion having smooth outer surface, an externally threaded portion and a peripheral outer flange, said chuck further being provided, between said smooth portion and said threaded portion, with a transverse cut extending inwardly into its axial bore and leaving a web connecting said threaded portion with said smooth portion, a securing nut engaging the threaded portion of the chuck, an apertured safety washer provided with a shaped opening extending to the periphery of the washer and adapted to be fitted slidingly over the web in the chuck and to resiliently engage, when in its operative position, the shoulder on a tool inside the chuck and to prevent thereby the dropping out of the tool, said securing nut being adapted, when screwed in, to press said washer against said shoulder in order to firmly secure said tapered tool shank into said frusto-conical portion of said bore in the chuck, a casing enclosing the chuck and provided with an opening for the fore end of the chuck and with two inner annular seats coaxial with the said opening, an anti-friction bearing fitted in each of said seats and rotatably supporting respectively the rear end of the chuck and a portion thereof lying between the web and said smooth portion, said casing being provided with an opening for the introduction of a lubricant, a cover slidably secured to said casing and movable between a position in which it closes said lubrication opening and a position in which it uncovers said lubrication opening.

10. In a tool holder, chiefly for holding a dentist's shouldered, rotatable tool having a tapered shank and a working head, a casing, an elongated one-piece chuck rotatably supported in said casing and having a rear end remote from said tool head and a fore end nearer said tool head, said chuck being provided with an axial bore including a frusto-conical portion adapted to hold said tapered tool shank, said chuck comprising, from its rear end to its fore end, a portion having a smooth outer surface, an externally threaded portion and a peripheral outer flange, said chuck further being provided, between said smooth portion and said threaded portion, with a transverse cut extending inwardly into its axial bore and leaving a web connecting said threaded portion with said smooth portion, a securing nut engaging the threaded portion of the chuck, an apertured safety washer provided with a keyhole-shaped opening extending to the periphery of said washer by a portion forming a passage normally having a breadth less than the breadth of said web of the chuck, said washer being resilient to permit said passage to be forced over said web of the chuck, the periphery of the opening in said washer engaging the shoulder on the tool when the washer has been urged to an operative position coaxial with said chuck and thereby preventing the tool from dropping out.

11. A tool holder according to claim 10, in which said nut is screwed in to press said washer against said shoulder of the tool to urge the tapered tool shank into said frusto-conical portion of the bore in the chuck.

References Cited in the file of this patent

UNITED STATES PATENTS

| | | |
|---|---|---|
| 1,458,293 | Hinchey | June 12, 1923 |
| 2,071,954 | Scruggs | Feb. 23, 1937 |